3,434,594
EMPTY BOTTLE INSPECTION MACHINE
Robert G. Husome, El Segundo, Calif., assignor to San Marino Electronic Corporation, El Segundo, Calif., a corporation of California
Filed May 16, 1967, Ser. No. 638,969
Int. Cl. B07c 5/34; B65g 47/42
U.S. Cl. 209—74
10 Claims

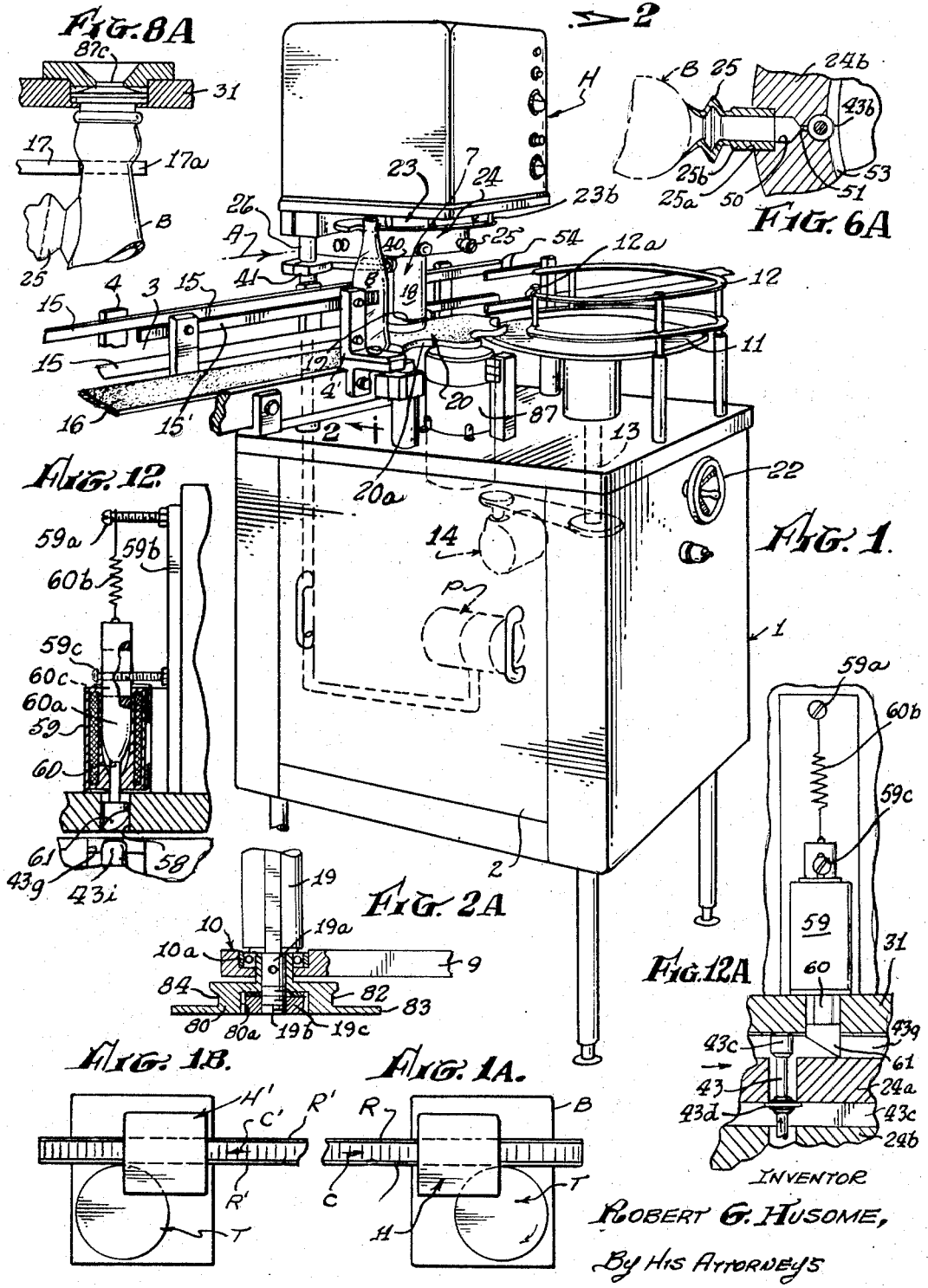

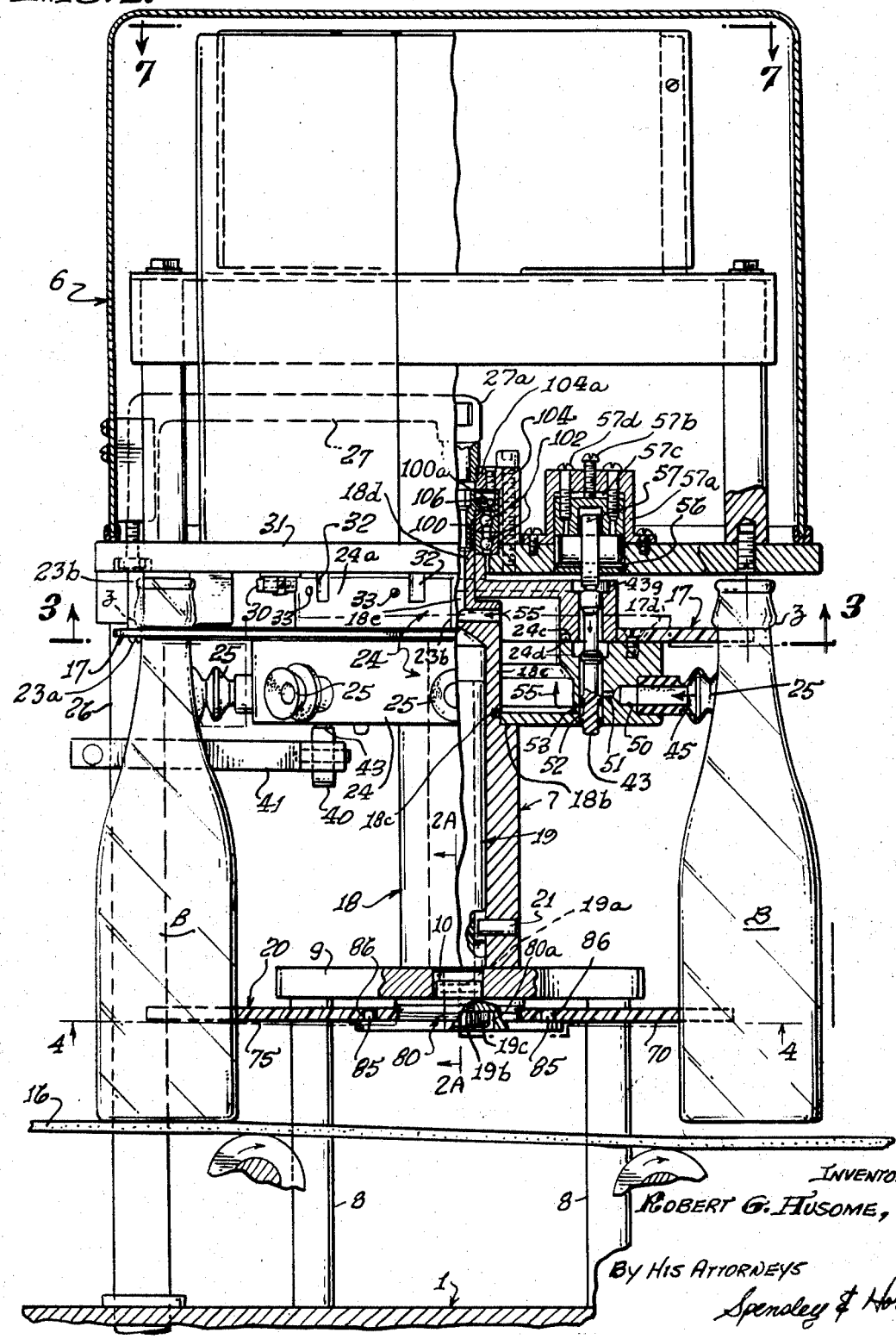

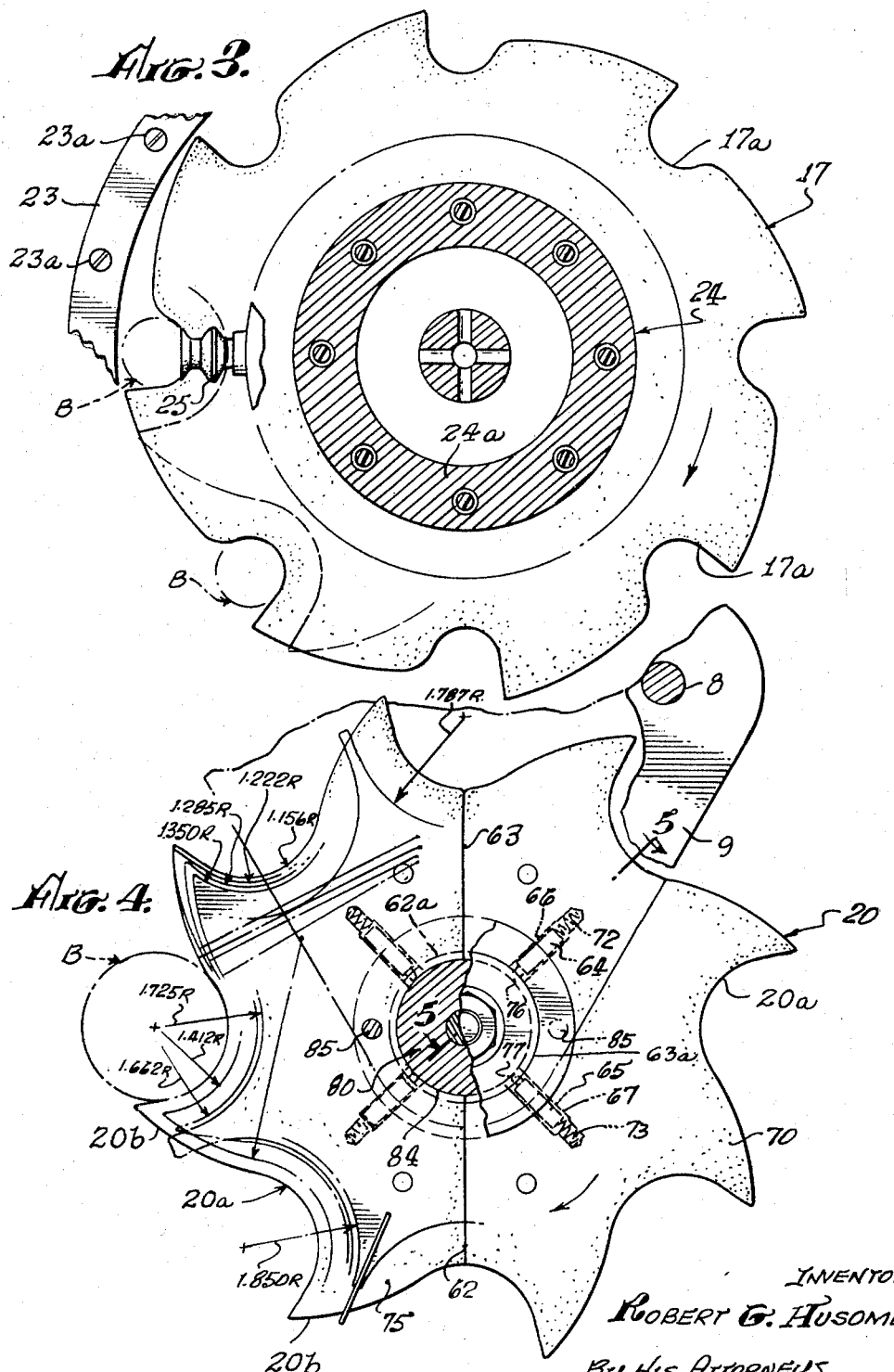

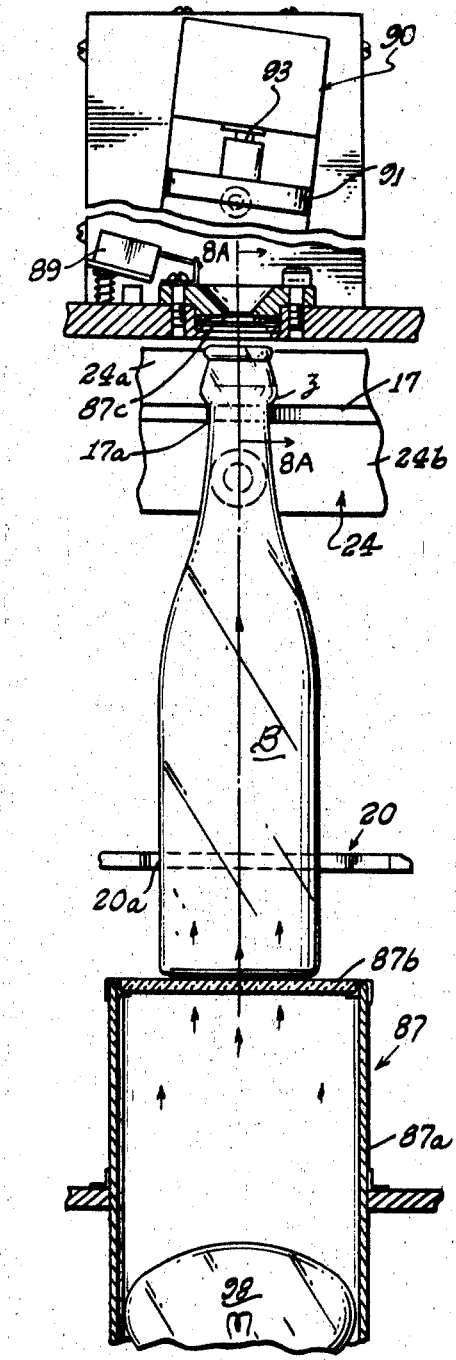
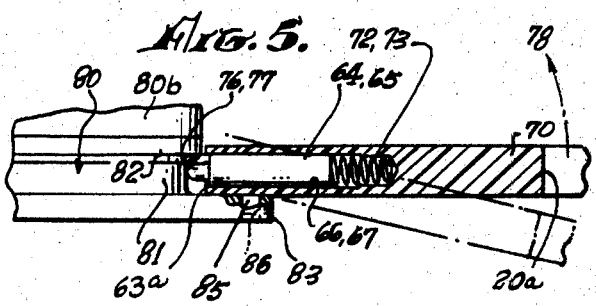
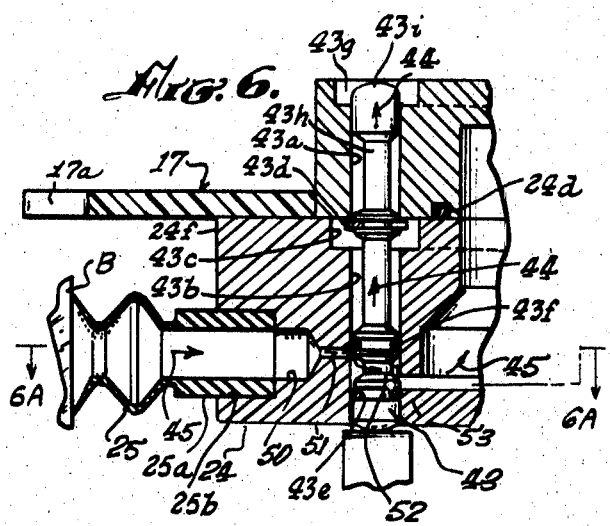
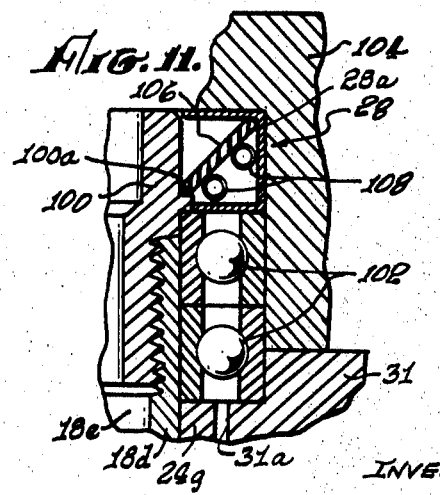

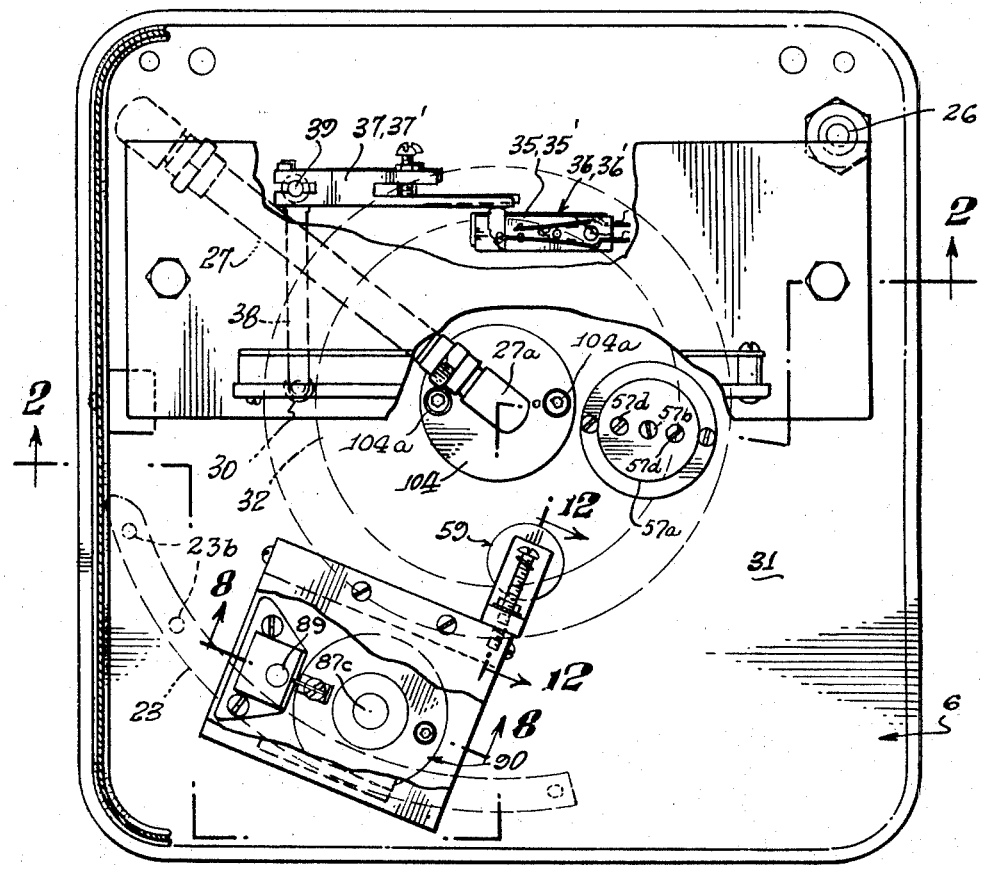
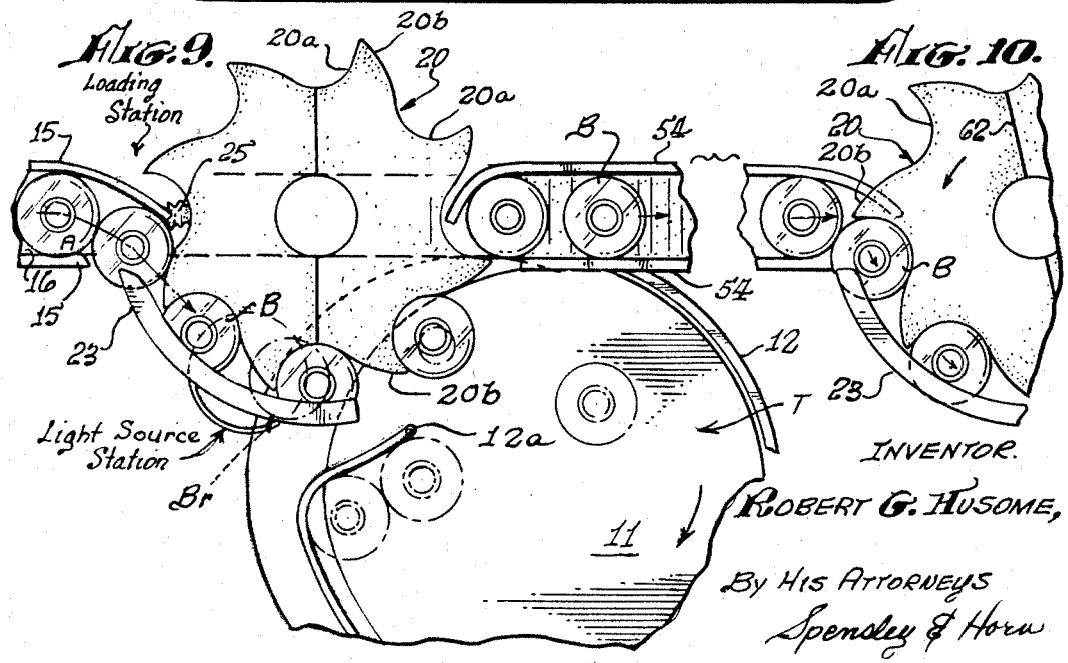

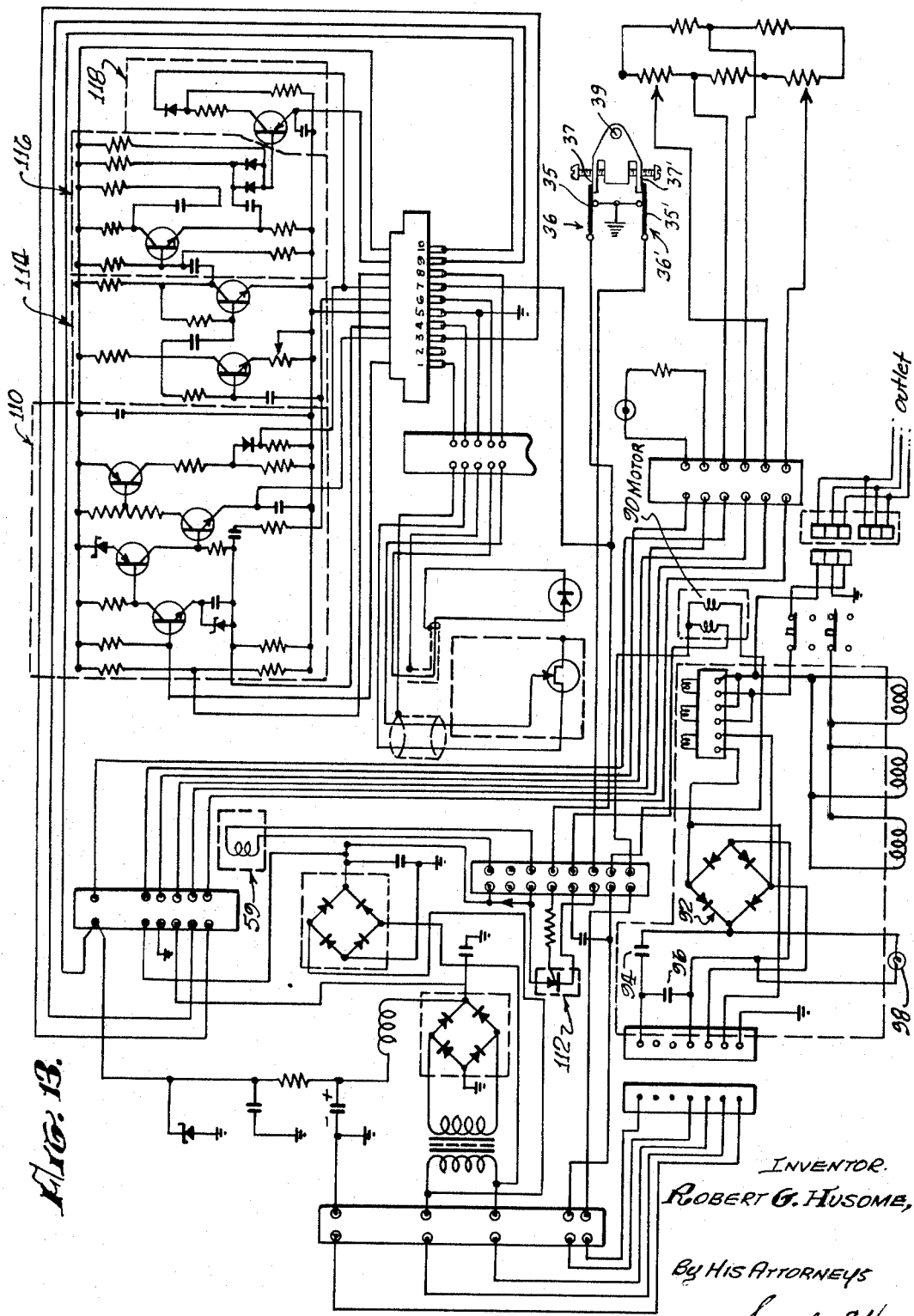

ABSTRACT OF THE DISCLOSURE

An improved mechanical handling system for an empty bottle inspection machine which diverts a line of bottles advancing on a conveyor means through an inspection path and at the terminus of that path returns only accepted bottles to the conveyor means; said machine including provision for rapid accommodation of various bottle sizes and heights though the use of a quickly replaceable lower star wheel and a vertically adjustable inspection head and upper star wheel and further including devices operative to remove rejected bottles from the inspection path.

BACKGROUND OF THE INVENTION

Field of invention

This invention relates to apparatus for inspecting empty bottles being transported by a conveyor means for the presence of foreign matter and more particularly to a machine having an improved and simplified mechanical handling system to accommodate bottles of different sizes and heights.

Description of the prior art

Most prior art bottle inspection machines involve the use of rather sophisticated bottle handling mechanisms as they are primarily designed for operation in a bottling line operating at high speeds i.e., on the order of 400–650 bottles per minute.

U.S. Letters Patent No. 2,800,226 teaches the use of a star wheel type of mechanism for advancing bottles from a conveyor line through a path traversing an inspection station and in which a vacuum is applied to a bottle to be rejected as a means for causing the bottle to be removed from the exiting conveyor line.

U.S. Letters Patent No. 3,160,277 teaches the use of a pulley mounted spring belt arrangement to maintain a succession of bottles in driving contact with the pockets of a star wheel means.

My co-pending previously filed U.S. patent application, Ser. No. 555,148, entitled "Empty Bottle Bottom and Neck Inspection Machine" filed June 3, 1966, discloses one of the previously mentioned prior art high speed empty bottle inspection machines presently being marketed. In this prior art machine, the bottles being inspected pass from an in-feed conveyor to an out-feed conveyor with electro-optical inspection occurring at a location intermediate these two positions. Therein the bottles are received by a so called free wheeling star wheel assembly consisting of upper and lower star wheel plates. An appropriate star wheel assembly is installed depending upon the diameter and height of the bottles to be inspected.

In most prior art machines, in addition to requiring a complete removal of one star wheel assembly and the substitution of another when changing bottle sizes, the lateral position of the inspection head need also be adjusted so that the bottles being inspected will always pass through the inspection zone. All of this adjustment and interchange of parts requires a certain amount of time and skill resulting in bottling line shutdown for the required interchange and adjustment.

Additionally, with prior art vacuum star wheel arrangements, it has heretofore been thought necessary to have the adjacent bottles touch or bear against one another even when they are in position within the pockets of the star wheel. This was believed to be necessary in order to cause the free wheeling star wheel to continue to be propelled by the incoming bottles delivered by the conveyor. That belief constituted a limitation of the prior art which precluded the possibility of providing a plurality of readily interchangeable, inexpensively produced, star wheel members all having the same number of pockets generated about centers of uniform radial distance from the axis of rotation of the star wheel assembly as is found in the present invention. In order to meet the "touching bottle" criteria, the prior art embodiments obviously needed a variety of star wheel configurations, varying either in diameter or number of pockets, to accommodate various bottle sizes in bearing relationship. Such a requirement resulted in untoward inconveniences and unnecessary expense to the customer.

Further, the prior art devices have heretofore included a gate means operative either to send an accepted bottle on to the out-feed conveyor line or, if rejected, to retain the bottle in the star wheel for transportation to a rejection station.

In the prior art system the clean bottles are maintained within the star wheel pockets during traverse of the inspection location by the application of a yielding, opposing force exerted by a free wheeling spring belt and pulley arrangement as is shown in U.S. Letters Patent No. 3,160,277.

This prior art bottle handling technique required an output gate at the selection location in order to insure that a jam in the out-feed line would not cause clean bottles to be rejected.

Since the prior art systems provide for the application of a vacuum holding means only to a bottle to be rejected, a failure of the vacuum system might not be discovered until long after the fact, with danger of the acceptance of bottles containing foreign matter.

SUMMARY OF THE INVENTION

The present invention is primarily directed to an improved and simplified bottle handling apparatus for an electro-optical empty bottle inspection machine. There is also included a novel feature in the means for generating the power for the scanner motor. All of the inventive features of the present invention are directed toward the provision of a smaller (in occupied floor space and conveyor space), simpler and less expensive bottle inspection machine than has heretofore been achieved by the prior art. The novel features of the present invention may best be summarized as follows:

The transport mechanism, including a vacuum equipped star wheel means for transporting the bottles from a receiving point on a conveyor to a point of return to that conveyor and, intermediately, through an inspection station, is constructed to provide for rapid and simple adjustment to accommodate bottles of various diameter and heights with a minimum of down time. All the bottles are secured to the star wheel by a vacuum cup means. The rejected bottles are removed from the path of transport defined by the star wheel assembly, obviating the necessity of a separate output gate mechanism downstream of the point of delivery to the conveyor.

Only the lower portion of the vacuum star wheel assembly need ever be removed to accommodate different bottle sizes, the upper portion thereof being permanently affixed to a rotatable suction cup bearing member and determining both the number of bottles and the axial lines thereof relative to the axis of the star wheel assembly.

The upper portion of the star wheel assembly has associated therewith a permanently positioned guide rail to assure the correct position and transport of all bottle sizes (at least of the types employing crown closures, such as soft drink and beer bottles).

A novel release and attachment design for quickly interchanging the lower star wheel component of the assembly is provided, including a split wheel design.

The novel construction of the fixed diameter star wheel serves to separate the bottles one from the other while providing for the application of continuous rotational forces irrespective of bottle configuration.

The bottles being inspected are held by vacuum within the star wheel pockets prior to and subsequent to inspection until reaching a release position either at the rejection point or at the point of delivery to the conveyor.

The means supporting both the inspection head (which houses all of the electronics for the system) and the upper cam portion of the star wheel assembly is adjusted by a simple external control means whereby the proper distance between the upper star wheel plate and the lower one is maintained in conformance with the height of the bottles to be inspected. Alignment between the complementary bottle engaging portions of the permanent upper plate and the readily interchangeable lower plate is always automatically maintained as the telescoping shafts which interconnect the two plates are keyed for axial movement.

Unlike the prior art vacuum star wheel systems, if suction is lost, all of the bottles will automatically be rejected by the present machine, rather than the reverse, thus providing quick notice of the fact of the loss of vacuum and also insuring that no bottles which should have been rejected will be passed as being clean.

The drive power for the high speed scanner motor (located in the inspection head) is derived from a ripple component of a frequency doubled pulsating current by a novel means permitting greatly increased simplicity of design and reduction of the cost of the machine.

It is therefore the primary object of this invention to provide an improved, compact electro-mechanical apparatus for the automatic, electro-optical inspection of empty bottles for the presence of foreign matter.

It is another object of the present invention to provide an empty bottle inspection machine of the character described which may be readily and quickly adjusted for accommodation of bottles of different diameters and heights.

It is a further object of the present invention to provide an empty bottle inspection machine of the character described which is fail-safe, that is, one which will not permit the passage of dirty bottles as clean bottles if a major subsystem in the machine fails.

A yet further object of the present invention is to provide a handling mechanism for empty bottle inspection machines in which the force of incoming conveyor fed bottles serves to carry the bottles through a path transversing a laterally offset inspection station and then returning accepted bottles only to the conveyor.

Another object of the present invention is to provide an empty bottle inspection machine of the character described which includes an inexpensive and reliable means for providing high speed motive power to a component of the inspection means.

The novel features which are believed to be characteristic of the invention, both as to its organization and method of operation, together with further objects and advantages thereof, will be better understood from the following description, considered in connection with the accompanying drawings, in which a presently preferred embodiment of the invention is illustrated by way of example. It is to be expressly understood, however, that the drawings are for the purposes of illustration and description only and are not intended as a definition of the limits of the invention.

BRIEF DESCRIPTION OF THE DRAWINGS

In the drawings:

FIGURE 1 is a perspective view showing the present invention apparatus in its presently preferred embodiment form;

FIGURES 1A and 1B are schematic plan views of a portion of FIGURE 1 showing the feed-in of the bottles to the machine in left-handed and right-handed versions thereof, respectively;

FIGURE 2 is an enlarged scale, fragmentary, sectional view taken in the plane of the staggered line 2—2 of FIGURES 1 and 7;

FIGURE 2A is an enlarged medial sectional view of the bearing means for the lower component of the star wheel assembly;

FIGURE 3 is a further enlarged scale, fragmentary, bottom plan, sectional view taken in the horizontal plane of the line 3—3 of FIGURE 2;

FIGURE 4 is a similarly further enlarged scale, fragmentary bottom plan, sectional view taken in the horizontal plane of the line 4—4 of FIGURE 2;

FIGURE 5 is a further enlarged fragmentary sectional view taken in the vertical plane of the line 5—5 of FIGURE 4;

FIGURE 6 is an enlarged scale, fragmentary, sectional view of a portion of the machine shown in FIGURE 2, showing the structure of the vacuum valve which imposition of controls the vacuum on the vacuum cup, shown in FIGURE 2 the section being taken in the vertical plane of the line 6—6 of FIGURE 3.

FIGURE 6A is a fragmtntary, sectional plan view taken in the horizontal plane of the line 6A—6A of FIGURE 6;

FIGURE 7 is a fragmentary, top plan sectional view taken in the horizontal plane of the line 7—7 of FIGURE 2;

FIGURE 8 is an enlarged scale fragmentary, elevational, partially sectional view taken in the vertical plane of the line 8—8 of FIGURE 7 and showing the basic optical portion of the system of the present invention as shown in the embodiments of FIGURES 1 and 2, when a bottle being inspected is traversing inspection station;

FIGURE 8A is a fragmentary partially sectional view taken at right angle to FIGURE 8 and particularly illustrating the bottle neck retaining guide means of the machine;

FIGURE 9 is a schematic view showing how bottles are diverted from the conveyor through the inspection station and thence either to the reject position or to their exit from the machine as a clean bottle;

FIGURE 10 is a view similar to that shown in FIGURE 9, showing only the loading station portion thereof when the bottles are in slightly different position from that shown in FIGURE 9;

FIGURE 11 is an enlarged scale fragmentary sectional view taken in a vertical plane of the upper portion of the turret and particularly showing details of sealing between rotating and stationary components;

FIGURE 12 is an enlarged scale, fragmentary, sectional view taken along the line 12—12 of FIGURE 7 showing details of the bottle rejecting solenoid in retracted position;

FIGURE 12A is a fragmentary, sectional view of the bottle rejecting solenoid means taken at right angles to FIGURE 12 and also showing the solenoid in its actuated position;

FIGURE 13 is a schematic circuit diagram of the electronics portion of the circuitry employed in the present invention;

DESCRIPTION OF THE PREFERRED EMBODIMENT

Figure 14:
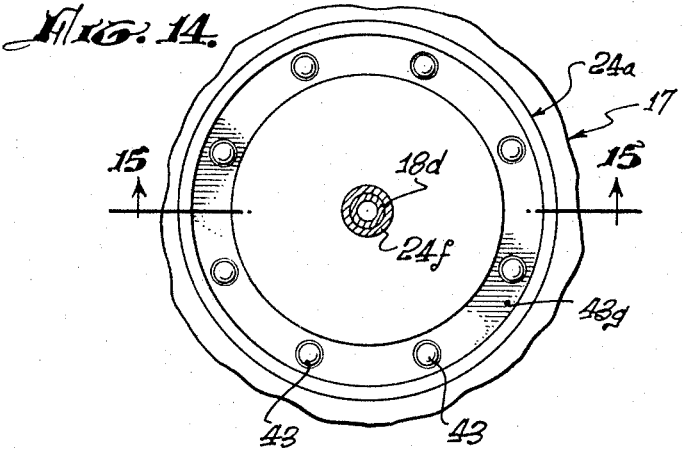
FIGURE 14 is a top plan, partially sectional view of the turret component of the machine, the section being taken substantially on the line 14—14 of FIGURE 2.
Figure 15:
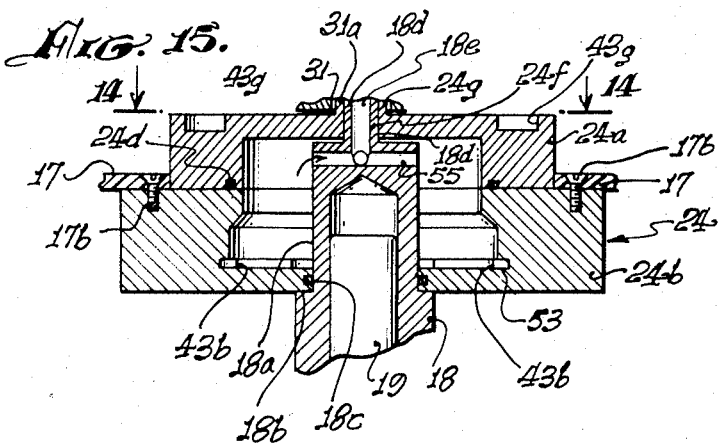
FIGURE 15 is a medial sectional view taken of the turret component of the star wheel assembly of the machine as viewed on the line 15—15 of FIGURE 14.

The operation of the presently preferred embodiment of this invention will now be described.

With reference to FIGURE 1, there is shown the perspective view of the present invention machine operating in the right-hand mode, that is, bottles are caused to move from left to right. It will, of course, be understood that the machine may be made so that bottles flow in the opposite direction i.e., from right to left, if the bottling line so requires it, by merely reversing the parts hereinafter to be described.

In this connection, FIGURES 1a and 1b show schematically the location of the main parts of the machine, viz., the base or body B, the inspection head H and the reject turn-table T for a right-hand and left-hand operation respectively. In the right-hand operation as shown in FIGURE 1A bottles are fed to and from the machine by a conveyer belt C operating between guide rails R and through a space between head H and the machine base B by devices presently to be described. In FIGURE 1B, the corresponding parts are indicated by the same letters with the addition of the exponent "'".

Referring now to the figures other than FIGURES 1A and 1B, the illustrated embodiment of the machine includes a hollow body portion 1 of rectangular configuration enclosing certain components some of which will hereinafter be described. Access to the interior is had through a door component 2. The body 1 extends beneath the endless conveyor means 16 which serves both to deliver the bottles to the machine and then remove the accepted bottles to the filling or other station. At the approach side, the conveyor includes vertically spaced rear guide rails 15, 15 and cooperating front rails 15', 15' defining a guiding channel 3 for the bottles, said rails being supported on bracket means 4 and 4' rising from the conveyor belt side rails. The ends of the rear rails 15, 15 forming the end of the channel from which the bottles emerge are curved laterally toward the front of the machine for diverting the bottles laterally from the conveyor into what will be hereafter referred to as the inspection path and which is an arcuate horizontal path departing from and then returning to the line of travel of the conveyor.

Mounted on a pair of tubular vertical supports 26, 26 at the rear of the machine body 1 and overhanging the conveyor and the inspection path of the bottles is a housing 6 for certain of the apparatus of the machine, some of which will be described with particularity as the description of the machine proceeds. The housing includes a base plate 31 provided with vertical axis bearing means for the upper end of a freely rotatable star wheel assembly 7 and the top surface of the machine body 1 adjacent the rear portion thereof is provided with a pair of spaced vertical posts 8, 8 from the upper ends of which a bracket member 9 projects forwardly, the distal end of which affords bearing means 10 for the lower end of the star wheel assembly 7. Also mounted for rotation about a vertical axis on the upper surface of the machine body 1 is a reject bottle removing turntable means 11 partially surrounded by a guard rail means 12 and including a vertical shaft 13 extending into the interior of the body and terminating in means drivingly connected to a motor 14. The novel manner in which this turntable actively cooperates with other components of the machine will be explained as the description of the embodiment proceeds. The star wheel components of the star wheel assembly 7 comprise an upper cam 17 carried by a suction turret assembly 24 which, in turn, is carried by an outer shaft 18 and a lower cam 20 which is removably mounted on an inner shaft 19. Shaft 19 is axially aligned and slidably engaged within shaft 18 for coincident rotation by means of the key 21 engaging a complementary keyway in the shaft 19. The spacing between the upper cam 17 and the lower cam 20 is adjusted by rotation of the handle 22 which, through a drive mechanism not shown, adjustably determines the location of the inspection head 6 together with shaft 18 and the components carried thereby comprising the upper cam 17, the suction turret assembly 24 and the upper cam 17. Additionally such adjustment includes the guide rail 23 which is secured to the upper side of the housing base by screws 23a and interposed spacers 23b. The function of this guide rail will be apparent as the description proceeds. The suction turret assembly is a hollow, cylindrical body comprising an upper member 24a and a lower member 24b secured together by screws or other suitable means with an O-ring gasket 24c contained in a groove 24d and interposed between the meeting faces of the turret portions. The turret portions are provided with centrally disposed bores in which, the shaft 18 is mounted as will presently be described in more detail. The lower turret portion is of greater diameter than the upper portion and thus provides a mounting ledge on which the upper cam 17 is secured by screws 17b. The lower portion 24b of the suction turret assembly 24 includes a plurality of suction cups 25, equiangularly disposed around the periphery of the turret and vertically aligned with the bottle engaging pockets of the upper and lower cams 17 and 20. Valve means presently to be described permits or prevents communication of these cups with the hollow interior of the turret assembly.

The bottle neck receiving pockets 17a of the upper cam 17 are represented by arcuate section generated about the axial line of the bottle and since all crown cap bottles for soft drinks and the like are of uniform configuration and diameter this cam need not be replaced incident to adaptation of the machine to a change in bottle sizes. The pockets 17a are complementary to the bottle neck diameter at the juncture with the peripheral bead Z which is disposed immediately below the cap engaged end portion and said juncture is formed as a sharp break in the contour in the bottle neck surface. Consequently, if the bottle is held in this pocket, even though supporting contact with the bottom of the bottle is removed, a bottle will remain suspended in the pocket 17a with which it is engaged.

The bottle receiving pockets 20a in the lower cam 20 are generated in vertical axial alignment with the pockets 17a but, as will be later explained in more detail, different plates will have pockets 20a generated about different radii from the bottle axial line to accommodate bottles of different body diameters. Between successive pockets therein in the same direction as the direction of rotation of the star wheel assembly, the cam plate 20 is provided with convexly curved portions 20b which are engaged by the advancing bottles and by reaction to such engagement cause the rotation of the star wheel assembly.

Referring now to FIGURES 9 and 10, it will be noted that the ends of the rear guides 15' adjacent to the perimeter of the cam wheel 20 are curved laterally forwardly diverting the line of the bottles advancing on the conveyor laterally toward the front of the machine and into successive engagement with the successive portions 20b at such an angle as to cause counter clockwise rotation of the star wheel assembly, successive bottles being forced into successive pockets 20a and each bottle being operated first by engagement with the preceding bottle and then with the next approaching cam surface 20b thus causing continued rotation of the wheel. It is to be noted that the terminus of this parade of bottles along the inspection path defined generally by the perimeter of the star wheel assembly intersects the path of travel of the conveyor means, that only accepted bottles are returned to the conveyor means, and that the rejected bottles are removed from the inspection path in advance of terminus of said inspection path.

The bottles, presumably from a washer, as indicated by the arrow A in FIGURES 1 and 1A, are carried by the conveyor belt between the guide rails 15 and 15' to the input to the star wheel assembly. The star wheel assembly is a freely rotatable unit and is driven in counter clockwise direction by the incoming bottles. Specifically, the shaft 18 projects above the upper end of the upper portion 24a of the turret assembly and is engaged by ball bearing means presently to be described while the lower end of the shaft 19 above the lower cam 20 is engaged by the bearing 10, the engagement between the shafts and their respective bearings precluding axial movement other than normal end play. The lead-in bottle, designated B in FIGURE 1, is engaged near its base by one of the pockets of the lower cam 20 and near its neck by the axially aligned pocket in the uper cam 17. Upon being received within the star wheel, the bottle B is secured within the pockets of the upper and lower cams 17 and 20 by a retention means integral to the turret assembly 24 which may typically be the application of a vacuum, thorugh the suction cup 25, to a portion of the bottle immediately below the neck portion engaged by the upper cam 17. The vacuum is applied to the suction cup just prior to the time that the bottle arrives at the suction cup. The means by which the vacuum is applied at the proper point in time will now be described.

Referring now to FIGURES 2, 6, and 7, there is shown a roller cam 40 maintained in fixed relationship with respect to the lower portion of the turret 24 by the support arm 41 which is mounted on one of the housing supports 26 for movement therewith incident to vertical adjustment of the start wheel assembly 7. The roller cam is so positioned such that just prior to the point in time when a suction cup 25 is placed in contact with an in-fed bottle, said cam impinges upon the lower portion of valve 43 and urges said valve in an upward direction to the position shown in FIGURE 6 and connecting the suction cup with the interior of the turret assembly which is constantly being evacuated thereby causing a vacuum to be applied thorugh the suction cup 25 to the bottle. The interior of the turret is evacuated by any suitable means as, for example, a motor driven vacuum pump P in the base 1 as shown in FIGURE 1. The connection between the pump and the turret assembly comprises a hose 27 which extends upward through the tubular inspection head support post 26, and thence the vacuum tubing connection 27a and downward through means to be described and including the rotary vacuum seal 28 to the interior of the turret assembly 24 and thence to those suction cups 25 whose associated valves 43 are in the upper position as shown by the arrows 44 in FIGURE 6. Each valve 43 is reciprocable in aligned bores 43a and 43b formed in the upper and lower turret portions, the upper end of the bore 43b terminating in the annular groove 43c forming a torodial recess with the upper and lower surfaces of which a snap ring 43d on the valve member 43a engages to limit the extent of reciprocation of the valve member. Each vacuum cup 25 is provided with a tubular shank 25a seated in a radial bore 25b in the side wall of the lower turret portion 24b and a small bore 51 and counterbore 50 affords communication between the interior of the vacuum cup and the valve bore 43b. Adjacent the lower surface of the hollow interior thereof the lower turret portion is provided with a peripheral groove 53 which communicates with the valve bore 43b below the horizontal plane of the bore 51.

The lower end of the valve is provided with a peripheral groove in which an O-ring gasket 43e sealingly engagng the bore 43b is seated for movement with the valve between the bottom of the lower turret member 24b and the bottom surface of the hollow interior of the turret assembly. Additionally, the valve member 43 is provided with a second O-ring gasket 43f similarly engaging the bore 43b and movable between positions above and below the bore 51 incident to vertical movement of the valve member.

When the valve 43 is lifted by the roller 40 to the position shown in FIGURE 6, the path of the vacuum through the interior of the turret assembly 24 and the valve 43 is indicated in FIGURE 6 by the arrows 45 as passing through the suction cup 25, the counterbore 50, the bore 51, the portion 52 of the bore 53 defined by the gaskets 43e and 43f to the constantly evacuated interior of the turret assembly, through the openings formed by the groove with 53, resultant tight gripping of each bottle by the suction cup associated with the aligned upper and lower cam wheel pockets.

When the bottle is thus engaged by the star wheel assembly, it is then transported through the inspection station (FIGURE 9). Referring now to FIGURES 2 and 7, there is shown the means by which the inspection interval of the inspection means is determined. The inspection head 6 includes a lower roller cam follower 30 carried by one end of a support lever 38 and disposed below and adjacent to the inspection head base plate 31 and maintained in yielding contact with the peripheral surface of the upper portion 24a of the turret 24 by means to be described. The opposite end of the support lever 38 is fixed to one end of a vertical rock shaft 39 journaled in and extending through the housing base 31. The cam follower 30 is the actuating element for a pair of stacked switches 36 and 36'. Switch 36 is the uppermost switch. Any suitable interconnecting lever means may be used to effect operation of the switches. Exemplifying a suitable arrangement, above the base plate 31, the shaft 39 may carry a pair of switch operating arms 37 and 37'. The initial adjustment of the arms is such that the contacts 35 and 35' of the normally open switches 36 and 36' are held closed against the bias of the spring means of the switch when the roller cam follower 30 is riding on the smooth portion 24a of the peripheral surface of the upper portion of the turret assembly 24. About the periphery of the upper portion of the turret assembly 24, in equiangular placement, there is provided a plurality of vertical grooves 32 one for each bottle holding section of the star wheel assembly and an equal number of bosses 33 in predetermined spaced apart relationship to each other and to each groove 33, said grooves and bosses being disposed in the path on the turret assembly traversed by the cam roller 30. As the star wheel assembly rotates the bottle into the inspection zone, the cam follower 30 rides into the next succeeding groove 32 allowing the contacts of switch 36 to open thereby initiating an inspection operation or interval as shown in the circuit in FIGURE 13 and described more fully hereinafter. The initial adjustment of the contact arm 37' is such that the contact 35' of the switch 36' remains closed. As the turret assembly rotates and the cam 30 leaves the groove 32, the contact 35 is returned to its closed position, thus terminating the inspection interval. Thus, the inspection interval occurs over a fixed distance of travel of the turret assembly past the cam follower 30 and the time for the inspection interval is a variable depending upon this distance at the linear rate of travel of the turret surface engaged by the cam follower. As the star wheel assembly is freely rotatable, such rotational speed is a function of the bottle input speed. The present invention may handle bottle input speeds from 0 to 250 bottles per minute.

When all of the bottles going through the star wheel assembly at a given point in time are free from foreign matter, there will typically be four bottles held within the star wheel assembly by the vacuum chucking arrangement just described. This may best be seen in FIGURE 9. Assuming that none of the bottles during the run is rejected, the bottles are allowed to continue on to the juncture of the inspection path with the conveyor (FIGURE 9) at which time the vacuum is released and the bottle is conveyed to a further station such as a filling machine (not shown), the bottles being diverted onto the conveyor by engaging the curved ends of the rear guide rails 54 of the conveyor. The means for releasing the vacuum as each bottle is returned to the conveyor line is as follows: once the valve 43 is pushed upwardly to its on vacuum position, it remains there by the frictional engagement of the valve gaskets until it is urged downwardly by an external force. The housing base plate 31 and the top surface of the turret assembly 24 are provided with cooperating means for returning each valve 43 to a position interrupting communication between the vacuum cup and the vacuum source and simultaneously opening the vacuum cup to atmosphere just prior to the instant when that bottle reaches the terminus of the inspection path. The vacuum releasing components for releasing non-rejected bottles to the conveyor comprise an annular groove 43g formed in the upper surface of the turret upper portion 24a of such a diameter that the valve bores 43a are disposed in the center of it. The valve members 43 include a stem 43h extending through the bore 43a and terminating in a head 43i which, when the valve is lifted by the roller 40, is substantially flush with the top surface of the turret assembly as shown in FIGURE 6. The upper face of the housing base 31 about the point at which the valves 43 are to be moved to their vacuum breaking position is provided with an opening 56 through which a roller 57 vertically adjustably mounted in a housing 57a extends into the groove in the excursion path of the elevated valve stem heads and moves them downwardly sufficiently to move the gasket ring 43f below the bore 51 thus cutting off vacuum from the interior of the turret and opening the vacuum cup to atmosphere through the bore 43a. A push screw 57b engaging a bearing block 57c vertically movable within the housing 57a and opposed by a pair of pull screws 57i threadedly engaging the block provides means for the vertical adjustment of the roller 57. Thus the bottle is released to be carried off by the conveyor line as there is no longer any force holding it within the pockets of the star wheel assembly.

The means by which the vacuum is released when a bottle is found to be rejected so that the suction cup holding it within the star wheel assembly pocket will release the same when the bottle is over the reject turntable 11 will now be described. If during the inspection interval, the bottle is found to be subject to rejection, the electronic circuit (FIGURE 13) receives a reject signal which results in the energization of a solenoid 59 which may best be seen in FIGURES 12 and 12A. This solenoid is vertically disposed upon the base plate 31 which includes an opening 58 therethrough to permit travel of the plunger arm 60 attached to the armature 60a of the solenoid 59. It will be noted that the distal end of the plunger arm is so shaped that there is presented an inclined cam surface 61. Energization of the solenoid 59 causes the cam surface 61 to be projected through the opening in the base plate, as shown in FIGURES 12 and 12A, and into the groove 43g with the cam surface so positioned in the path of the oncoming valve 43 that rotation of the turret 24 drives the valve head 43i into contact with cam surface and forces it downwardly to the off vacuum position previously described, thus causing the bottle B to be dropped on the surface of the turntable 11 by release of the vacuum when the bottle reaches the position indicated by the numeral B$_r$ as shown in FIGURE 9. Thus the solenoid plunger operates by rejecting the very next bottle without requiring any sort of memory device, either mechanical or electronic. Further, after ejection is complete, the next following boss 33 adjacent to the groove or dimple 32 on the surface of the upper portion of the turret 24 causes the roller cam follower 30 to pivot the contact arm 37′, shown in FIGURE 7, opening the contact 35′ of switch 36′ thereby causing the solenoid 59 to be disengaged and allowing the plunger arm 60 to be returned to its normal position by the spring 60b. Thus the next bottle will be vacuum held until such time as the bottle appears over the out-feed conveyor belt or it is rejected as previously described. In addition to the solenoid components above described it will be noted that the spring 60b extends from a screw 59a carried by a post 59b attached to the solenoid body and that said post includes a second screw 59c extending through an elongated slot 60c in the armature extension both limiting the extent of armature movement and preventing rotation of the armature so that the inclined surface 61 is maintained in the correct position.

The turntable 11 has an active and novel function in that it is the instrumentality by which a rejected bottle is removed from a line of bottles traversing the inspection path of the machine. Referring to FIGURES 7 and 9, it will be noted that the solenoid 59 is disposed somewhat to the right of a "six-o-clock" position with reference to the inspection path of the machine. The top surface of the turntable is disposed in substantially the same horizontal plane as the top surface of the light source causing 87, i.e., slightly below the bottom surface of the bottles passing through the machine. When a rejected bottle is released by the associated vacuum cup it will be dropped to the surface of the turntable 11 at a point slightly further advanced in a counter clockwise direction from the center line of the solenoid 59 and this will be close to a line containing the axes of the star wheel assembly and the turntable is being rotated in a clockwise direction and at such a rate that the surface speed at the point initially contacted by a rejected bottle is considerably greater than that of the star wheel assembly with the result that the turnable moves a rejected bottle in an arcuate path first extending forward out of the star wheel assembly pocket and then laterally away from the inspection path and into engagement with the bottle stop portion 12a of the turntable guard rail means 12.

The bottom wall of the lower turret portion 24b is provided with axial bore 24e forming a close fit with a reduced diameter portion 18a of the shaft 18 and forming a shoulder 18b upon which the turret assembly is supported. A peripheral groove in the portion 18a of the shaft opposite the side wall of the bore 24e houses a sealing O-ring gasket 18c. The upper end of the shaft 18 is further provided with a second reduced diameter portion 18d forming a close fit with an axial bore 24f extending through the top wall of the upper portion 24a of the turret assembly including the upwardly extending neck portion 24g thereof.

The upper surface of the housing base plate 31 is provided with a bore 31a through which the reduced diameter end portion 18d of the shaft projects, said bore terminating at the upper face of said base plate in a shallow counterbore 31b seating the outer race of the lower one of a pair of radial thrust ball bearing members 102, 102 the inner races of which engage the portion 18d of the shaft. The upper end of the shaft is provided with an axial bore 18e which at its outer end is threaded to receive a hollow bolt 100 having an external shoulder 100a engaging the inner race of the upper bearing 102 and thus serving to clamp the bearings 102 and the turret assembly 24 to the shaft 18a. The bore 18e continues into the upper end of the reduced diameter portion 18a and terminates in intersecting cross bores 18f affording communication with the interior of the turret. The rotary vacuum seal assembly 28 surrounds the portion of the bolt 100 which extends above the bearings 102 and a stationary bearing cap 104 secured to the upper face of the base plate 31 by screws 104a surrounds and envelopes the bearings 102, the bolt 100, and the seal assembly 28, said assembly comprising an internally channeled body 28a; a sealing member 106 constructed of a semi-flexible material such as leather and garter springs 108 operative to urge the sealing member 106 in firm contact with the round smooth head of the bolt 100 and the body 28a thereby forming a vacuum seal between the stationary cap 104 and the rotatable bolt 100 to prevent the entrance of air past the bearings 102 and into the evacuated area. The top end of the bearing cap 104 is provided with a threaded hole 104b with which a fitting 27a on the end of the tubing 27 is connected.

In FIGURE 4 there is shown an overlay, in part, of various exemplary shapes for the split lower cam 20 of the star wheel to accommodate different diameters of bottles. As shown in FIGURE 4, lower cam 20 consists of two half portions divided along the diametral line 62. Referring now to FIGURE 4 and FIGURE 5, the structure by which the lower cam portion 20 of the star wheel may be readily and quickly removed and a new one replaced is disclosed. Since the halves are identical, a description of one will suffice for both.

The lower end 19a of the shaft 19 is reduced in diameter and extends through the inner race of a ball bearing means 10 seated in a socket 10a at the distal end of the bearing bracket 9, said lower end terminating in a threaded portion 19b. Below the bearing bracket, the shaft end 19a carries a hub member 80 engaging the ball bearing inner race. A nut 19c on the threaded portion clamps the hub and the bearing inner race against the shoulder formed by the juncture of the shaft 19 and the reduced diameter end 19a thereof, said nut being housed within a counterbore 80a on the under face of the hub member 80 for compactness.

The lower end of the hub member 80 is formed as a thin radially extending flange portion 83 having the upper face thereof disposed to support the halves of the lower cam 20. To this end, the flange is provided with a diametrally opposite pair of dowel receiving holes 86, 86 for engagement with dowel pins 85, 85 on the cam 20 halves as will presently be described. Additionally, the hub member 80 is provided with a peripheral groove 84 disposed at the juncture of the upper surface of the flange 83 with the body of the hub member, one side of said groove being a continuation of the upper surface of the flange 83 and the opposite side surface 82 being outwardly and upwardly inclined to meet the peripheral surface of the hub member body portion 80b.

The halves of the lower cam 20 are identical and meet on a diametral line comprising the opposed faces 62 and 63 thereof said faces being concavely relieved at their mid length as at 62a and 63a to provide clearance for the body 80b of the hub. At the mid point thereof each of said halves is provided with a dowel pin 85 projecting from the under side thereof and adapted to engage one each of the holes 86, 86 in the flange 83, said dowel pins thus serving to rotatively locate the halves on the flange and, as will presently appear serving also as a component of the means by which the halves are releasably secured to the hub member 80.

The half 70 is provided with a pair of bores 66 and 67 extending radially outwardly from the concave surface 62a and spaced at equal distances between each face 62, and a radial line normal to said faces. Latch pins 64 and 65 slideably mounted in bores 66 and 67 are yieldingly urged outwardly by compression springs 72 and 73, said pins being retained by means not shown under a condition holding the associated springs under an initial load. The ends of the pins 76 and 77 which project from the bores 66 and 67 are of reduced diameter and are rounded.

Referring now to FIGURE 5, it will be noted that the cam half 70 is anchored on the hub member by the outward pressure exerted by the springs 72 and 73 reacting between the inner ends of the pins 64 and 65 and the bottoms of the bores 66 and 67, the reduced diameter ends 76 and 77 of the pins bearing on the bottom surface of the groove 84 and the force thus exerted being resisted by the interengagement of the dowel pin 85 with the bore 86. To remove the cam wheel half 70, downward pressure is exerted at the mid point in the peripheral surface thereof causing the half to fulcrum about the corner of the flange 83 opposite the point of application pressure and consequent camming of the pin ends 76 and 77 past the sloping upper surface of the groove 84 on an arcuate path which is parallel to the arcuate path of the center of the curved portion 62a incident to that tilting action. This movement both moves the pins out of locking engagement with the groove 84 and also raises the pin 85 out of the hole 86 to completely disengage the half from the hub member. Replacement of another half as for a different diameter of bottle body would follow the reverse of the described action and the removal and replacement of the other half 75 would be a mere repetition of that which has been described.

It will be understood that the initial mounting of the hub member 80 on the shaft 19 is such that the pocket portions of cam plates mounted thereon will be in proper vertical alignment with the corresponding pocket portions of the upper cam plate.

Referring now to FIGURE 8, the means by which the bottles are inspected will now be described. The inspection means includes a light source generally indicated at 87 and comprising a hollow vertical cylindrical member 87a extending through the top surface of the base 1 and having a translucent, light diffusing top surface 87b disposed below and closely adjacent to the path of travel of the bottoms of bottles carried through the inspecting path by the star wheel assembly. A lamp 98 disposed in the lower end of said casing and energized by circuitry to be described, supplies an upwardly directed light beam which passes through the bottles as they traverse the inspection path and impinges on a receptor means adapted to react to the condition of the bottles as will be later described.

Directly vertically above the light source means, the housing base plate 31 is provided with an opening therethrough in which a lens 87c is mounted to collect and concentrate light received from the light source and modified by passage through an interposed bottle on a rotating scanning member 91. The scanning member is rotatable with the drive shaft 93, said rotation being supplied by the induction motor 90. The scanning member 91 is typically an opaque disc-like member with a substantially radial, light reflecting line on the face thereof exposed to the light source 87. The axis of rotation of the member 91 is offset from the vertical so that light received from the neck and bottom of the bottle is reflected onto the photocell 89. The photocell used in the preferred embodiment of the invention is of the photo field effect transistor type. Thus, as the scanning member 91 rotates, the light reflecting line will alternately "see" and reflect to the photocell 89 the full intensity of the intercepted light and the lower light intensity occasioned by the presence of a particle of foreign matter in the bottle.

Referring now to FIGURES 8 and 13, the manner in which power to the motor 90 is generated will now be described. A readily available 60 cycle alternating current input is impressed across a retifier bridge 92 and creating a 120 cycle pulsating direct current. A coupling, or blocking, capacitor 94 is provided to remove the direct current components from the resulting pulsating direct current thus allowing only 120 cycle nondirect current pulsations through to the induction type scanner motor 90. The shunt capacitor 96 serves to eliminate undesirable high frequencies. A 300 watt light bulb 98 is employed as the inspection light source and as a means to dissipate generated direct current power not necessary to the driving of the scanner motor 90. Thus is described a relatively inexpensive means, utilizing ordinarily available power sources, of providing a driving force to the scanner motor 90 which will produce revolution rates in excess of 7,000 r.p.m. as required by the inspection system employed and previously described.

Referring now to FIGURE 13, there is generally described the detection electronics of the present invention. As shown in FIGURE 8, light passing through the bottle is interrupted by the scanning member 91 and reflected to the photocell 89. The output of the photocell 89 is a signal indicative of the presence or absence of foreign matter in the bottle. This signal is comprised of both DC and non-DC, or pulse-type components. This signal is the input to the DC amplifier 110. If the DC component level is below a predetermined level, as would be the case if great opacity or large objects were in the bottle, there is generated in the DC amplifier 110 a DC voltage which causes the silicon controlled rectifier 112 to fire which in turn actuates the solenoid 59, rejecting the bottle as hereinbefore described. A small particle in the bottle will generate the non-DC, or pulse, component of the photocell output. This component is passed on through the DC amplifier to the differentiating amplifier 114 whose output is a signal proportional to the rate of change of magnitude of the input pulse. As the pulse generated will have both a positive and negative direction, the phase inverter 116 is employed for ease of comparison of the positive and negative going differentiated pulses. If the magnitude of either output signal of the differentiating amplifier 114 is sufficient, that signal will be amplified in the power amplifier 118 and used to fire the SCR 112 to reject the bottle as hereinbefore described.

There has thus been described an improved handling mechanism for an empty bottle inspection machine. Unlike prior art machines, the present invention provides means for easily and rapidly accommodating bottles of different sizes, heights and configurations, as well as a fail-safe selective handling system which in event of failure of the inspection light beam, will reject all bottles. Moreover, changes in dimension and the like may be made. For example, the angular position of the inspection station relative to the line of conveyor travel may be varied in different machines, as suggested by a comparison of FIGURES 7 and 9, or the vertical distance between the horizontal planes of the conveyor and the lower component of the star wheel may likewise be varied when and if a particular design of bottle body makes such modification desirable.

What is claimed is:

1. In an empty bottle inspection machine, a freely rotatable means operative to grip all bottles supplied thereto seriatim and convey them through an inspection path past an inspection means en route to a delivery point for accepted bottles; a first bottle disengaging means disposed in said inspection path downstream of said inspection means normally operative to disengage each bottle delivered to the conveyor at the point of delivery, a second bottle disengaging means disposed in said inspection path between said inspection means and said first bottle disengaging means, and an interconnection between said inspection means and said second bottle disengaging means operative to maintain said second bottle disengaging means disabled except when said inspection means detects a bottle containing foreign matter or when said inspection means is disabled.

2. In an empty bottle inspection machine adapted to be installed to receive bottles delivered thereto by a conveyor and to return all but rejected bottles to the same conveyor, the combination of a frame structure; a vertical axis rotatable means operative to receive bottles from the conveyor and to transport received bottles through an inspection path generated about the axis of rotation of said transport means, and a foreign matter detection means disposed to be traversed by bottles transported through said inspection path, said transport means including a bottle neck engaging component provided with a plurality of bottle neck engaging pockets disposed in equally peripherally spaced relation about the perimeter of said component and said transport means further including a bottle body engaging means provided with an equal number of bottle body engaging pockets disposed one each in a vertical alignment with one each of said bottle neck engaging pockets, said bottle body engaging means including a base portion and interchangeable bottle body engaging portions to accommodate different diameters of bottle bodies.

3. In an empty bottle inspection machine, a base adapted to be disposed below a conveyor by which bottles are being transported seriatim in upright position; a housing disposed above the conveyor means and carried by means on said base laterally offset from the conveyor and by which said housing may be vertically adjusted with respect to said base, and means operative to divert the bottles from the conveyor and transport them through an inspection path which rejoins the conveyor beyond the point at which the bottles were diverted into said inspection path, said bottle diverting and transporting means including a unit freely rotatable about a vertical axis and comprising bottle neck and bottle body engaging components mounted, respectively, for rotation only on said housing and only on said base and including interconnecting means operative to prevent relative rotation of said components while permitting relative axial movement therebetween incident to adjustment of said unit to accommodate bottles of different heights.

4. In an empty bottle inspection machine adapted to be installed in such adjacency to a conveyor means that the conveyor means delivers bottles to the machine and carries away such of the bottles as are returned to it by the machine; bottle transport means on said machine including bottle engaging devices responsive to the force exerted thereon by bottles delivered thereto by the conveyor means operative to transport received bottles at an uninterrupted linear rate of speed substantially equal to the linear rate of speed of the conveyor along a path beginning and ending at spaced points along the conveyor means and through an inspection means disposed intermediate the ends of said path, disabling means for said bottle engaging devices subject to control by said inspection means operative to effect disengagement of a bottle rejected by said inspection means from said transport means and other devices operative to be engaged by a bottle which has been caused to be disengaged from said transport means by said inspection means and to remove it from the normal path of transport of bottles.

5. In an empty bottle inspection machine adapted to be installed to receive bottles delivered thereto by a conveyor and to return all except rejected ones of the delivered bottles to the same conveyor; a vertical axis rotatable means operative to engage and transport received bottles through an inspection path terminating at the point at which bottles are returned to the conveyor, a foreign matter detection means disposed to be traversed by bottles transported through said inspection path, vacuum cup means carried by said rotatable means and normally operative to hold each bottle in said rotatable means during the traverse of said inspection path, and devices actuated by response of said detection means to foreign matter detected in a bottle operative to release the vacuum cup engagement of that bottle prior to the approach of that bottle to the point of termination of said inspection path.

6. A machine as claimed in claim 5 in which said machine includes a horizontal surface disposed at the point at which a rejected bottle is released and upon which a rejected bottle is dropped when released by the vacuum cup means, said surface being constantly moving in a direction and at a rate of linear speed at the point contacted by the rejected bottle sufficient to carry the rejected bottle out of said inspection path and out of interference with the next following bottle.

7. In an empty bottle inspection machine adapted to be installed to receive bottles delivered thereto by a conveyor and to return all but rejected bottles to the same conveyor; said machine including a vertical axis rotatable means operative to transport received bottles through a path which is not coincident with the conveyor path and in which path they are caused to traverse an inspection means and to be diverted from said path, if rejected, said rotatable transport means comprising a freely rotatable star wheel assembly including a plurality of peripherally spaced bottle neck engaging pockets, an equal number of peripherally spaced bottle body engaging pockets disposed in vertical alignment with complementary ones of said bottle neck engaging pockets and an equal number of vacuum cup devices separately operative to engage and hold a received bottle in engagement with an aligned pair comprising one of said bottle neck engaging pockets and one of said bottle body engaging pockets while being transported by said rotatable means, a first vacuum cup disenaging means operative to disable the vacuum engagement of any vacuum cup which is holding a bottle rejected by said inspection means, and a second vacuum cup disengaging means operative to disable the vacuum engagement of any vacuum cup not previously disengaged by said first disengaging means.

8. A machine as claimed in claim 7 in which said rotatable means includes a cavity constantly connected to a source of negative pressure, and valve means associated with each of said vacuum cup devices, and in which a non-rotating component of said machine carries a first valve opertaing means effective to actuate each of said valve means in succession to connect the associated vacuum cup with said cavity at a time substantially coincident with the engagement of a bottle with the pair of pockets associated with that vacuum cup.

9. A machine as claimed in claim 7 in which a vertical axis power operated turntable is disposed below a horizontal plane containing the bottom surfaces of bottles being transported by said rotatable means and positioned to receive bottles released by said first vacuum cup disengaging means and to carry such bottles out of said inspection path.

10. In an inspection apparatus for light transmitting articles and operative to determine quality by the degree of light transmission by the articles; means for transporting the articles to be inspected along an inspection path, a light source at one side of said path, a photocell at the opposite side of said path, means projecting light from said source across said path and through the articles being transported along said path, a light magniture receptor means disposed at the side of said path opposite said light source and including a rotating mirror disposed at an acuate angle with respect to the axial ray of said light source and having a limited reflecting area arranged to intermittently intercept and reflect light rays being transmitted through the articles being inspected to said photocell, means for energizing said inspection means including means affording electrical connection with a source of alternating current, means for converting received alternating current into a pulsating current having double the frequency of the received current, an induction motor driving said mirror, electrical connection delivering the non-direct component of said pulsating current to said motor and means for delivering the direct current component of said pulsing current to said light source. rent component of said pulsating current to said light source.

References Cited

UNITED STATES PATENTS 3,150,266  9/1964  Mathias.

ALLEN N. KNOWLES, *Primary Examiner.*

U.S. Cl. X.R.

209—111.7; 250—223; 198—22, 25, 210